(12) United States Patent
De Pelsemaeker et al.

(10) Patent No.: US 12,036,841 B2
(45) Date of Patent: Jul. 16, 2024

(54) MOTOR VEHICLE VENTILATOR, THERMAL MANAGEMENT DEVICE AND METHOD USING SUCH A MOTOR VEHICLE VENTILATOR

(71) Applicant: Valeo Systemes Thermiques, Le Mesnil Saint-Denis (FR)

(72) Inventors: Georges De Pelsemaeker, Le Mesnil Saint Denis (FR); Daniel Neveu, Le Mesnil Saint Denis (FR); Lucas Trevalinet, Le Mesnil Saint Denis (FR); Mohamed-Amine Boubaker, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 399 days.

(21) Appl. No.: 17/279,332

(22) PCT Filed: Sep. 25, 2019

(86) PCT No.: PCT/FR2019/052244
§ 371 (c)(1),
(2) Date: Mar. 24, 2021

(87) PCT Pub. No.: WO2020/065205
PCT Pub. Date: Apr. 2, 2020

(65) Prior Publication Data
US 2021/0402847 A1    Dec. 30, 2021

(30) Foreign Application Priority Data
Sep. 27, 2018   (FR) ........................ 1858849

(51) Int. Cl.
*B60H 1/00*     (2006.01)
*B60H 1/34*     (2006.01)

(52) U.S. Cl.
CPC ..... *B60H 1/00742* (2013.01); *B60H 1/00671* (2013.01); *B60H 1/0075* (2013.01);
(Continued)

(58) Field of Classification Search
CPC ............ B60H 1/00742; B60H 1/00671; B60H 1/0075; B60H 1/00828; B60H 1/00835;
(Continued)

(56) References Cited

U.S. PATENT DOCUMENTS

2014/0364045 A1 * 12/2014 Noichl ................. B60H 1/3421
454/313

FOREIGN PATENT DOCUMENTS

DE           10223660 B4 * 10/2013  ........... B60H 1/3442
DE       102016003974 A1 *  9/2016
(Continued)

OTHER PUBLICATIONS

Notification of Reason for Rejection issued in Japanese Patent Application No. 2021-517378, dated Jun. 24, 2022 (14 pages).
(Continued)

*Primary Examiner* — Emmanuel E Duke
(74) *Attorney, Agent, or Firm* — Osha Bergman Watanabe & Burton LLP (57) ABSTRACT

The invention concerns a ventilator for a motor vehicle passenger compartment, intended to deliver an air flow towards a space to be conditioned, which comprises: an opening through which an air flow flows during operation, a flared guiding surface (S), extending from the opening, a needle valve (25) comprising a needle valve head (27) with: a tip (29) situated at the end of the needle valve (25), a maximum width portion corresponding in shape to the opening (O), with dimensions of between 80% and 100% of those of the opening (O), a base (33) flared in the direction of flow linking the head (29) to an elongate body (31), the
(Continued)

needle valve (25) being able to move in translation between two end positions including: a deployed end position in which the widest portion of the needle valve head (27) is downstream from the opening (O) in the direction of the space to be conditioned, the air flow then being laminar and guided by the guiding surface (S) in a divergent flow, a retracted end position in which the widest portion of the needle valve head (27) is upstream from the opening (O), the air flow then being laminar and guided by the tip (29) of the needle valve (25) in a convergent flow.

12 Claims, 4 Drawing Sheets

(52) U.S. Cl.
CPC ..... *B60H 1/00828* (2013.01); *B60H 1/00835* (2013.01); *B60H 1/00871* (2013.01); *B60H 1/345* (2013.01); *B60H 2001/3485* (2013.01)

(58) Field of Classification Search
CPC .. B60H 1/00871; B60H 1/345; B60H 1/3442; B60H 1/00478; B60H 1/00821; B60H 2001/3485
See application file for complete search history.

(56) References Cited

FOREIGN PATENT DOCUMENTS

| | | | |
|---|---|---|---|
| EP | 1454780 | A2 | 9/2004 |
| FR | 2784625 | A1 | 4/2000 |
| FR | 2886385 | A1 | 12/2006 |
| GB | 520452 | A * | 4/1940 |
| GB | 520452 | A | 4/1940 |
| JP | S63-169312 | U | 11/1988 |
| JP | H0573449 | U * | 3/1993 |
| JP | H05-073449 | U | 10/1993 |
| JP | H0573449 | U * | 10/1993 |
| JP | H07-156647 | A | 6/1995 |
| JP | 2007-050781 | A | 3/2007 |
| JP | 2010-117068 | A | 5/2010 |
| JP | 2010117068 | A * | 5/2010 |
| KR | 20030041343 | A | 5/2003 |

OTHER PUBLICATIONS

International Search Report and Written Opinion issued in corresponding International Patent Application No. PCT/FR2019/052244, mailed on Dec. 5, 2019 (10 pages).

* cited by examiner

MOTOR VEHICLE VENTILATOR, THERMAL MANAGEMENT DEVICE AND METHOD USING SUCH A MOTOR VEHICLE VENTILATOR

BACKGROUND

The present invention relates to a motor vehicle vent, for ventilating the interior of a motor vehicle, particularly in the context of the heat control of said interior.

Conventional heat control modules for vehicles generally comprise an air blower, coupled with a heat control circuit comprising thermal-conditioning elements such as compressors, evaporators, heat exchangers and heating resistors. A plurality of vents distributed through the vehicle interior then inject the air set in motion by the blower and cooled by the cold generator at various points in the vehicle interior (central console, the feet of the occupants, at roof level, etc.).

These heat control modules, which have a cooling action, are high-powered, generating an air flow rate of 150 to 450 kg/h cooled to temperatures of around 4 to 5° C. The vents, which are in the form of louvered gratings and guide slats, output a flow that is diffuse, wide, uniform and flows slowly. Heat control modules are often intended to cool the entire interior of the vehicle uniformly.

The heat control power is thus uniform, whatever the size, the position, and the build of the occupant. The only customization that is possible is achieved by orienting the guide slats of the vents, with or without the opening of a window, and by controlling flow rates in a mixer where the air is from the heat control module.

The interior of the vehicle exhibits a high level of thermal inertia, and spaces in which the occupants are not situated also need to be cooled, whereas hotspots such as parts of the body of the occupant that are exposed to the sun are not specifically cooled. The level of comfort felt is thus reduced.

For several tens of seconds to several minutes, a user therefore only partially feels the cooling or the heat provided by the heat control module, if at all.

Moreover, for an optimal and rapid feeling of coolness, different parts of the body of the driver or passenger need to be cooled as a priority, with power adaptation, in particular depending on whether or not these parts are covered by clothing. The head, the face and the hands are parts of the body that are generally unclothed, having a large area for heat exchange and a high degree of vascularization, and thus constitute portions of the body in which coolness is felt immediately.

Similarly, for an optimal and rapid feeling of warmth, the hands and face need to be heated as a priority.

Moreover, the fact that the flow of conditioned air passes out through static gratings once the direction has been set allows only limited adaptation of the feeling of coolness to the occupant of the vehicle, their build, their size and their position in the vehicle interior.

In order to at least partially solve the abovementioned problem, the subject of the invention is a motor vehicle interior vent intended to deliver a flow of air in the direction of a space to be conditioned.

SUMMARY

In one aspect, embodiments disclosed herein relate to a motor vehicle interior vent intended to deliver a flow of air in the direction of a space to be conditioned, characterized in that it has:

an opening, through which a flow of air can flow during operation,
a flared guide surface, extending from the opening, and flared in the direction of flow of the flow of air,
a needle valve having a needle valve head with:
  a tip situated at the end of the needle valve,
  a portion of maximum width with a shape corresponding to the opening, with dimensions of between 80% and 100% of those of the opening,
  a flared base in the direction of flow connecting the head to an elongate body,
the needle valve being movable in translation between two end positions, namely:
  a deployed end position in which the widest portion of the needle valve head is downstream of the opening in the direction of the space to be conditioned, the flow of air then being laminar and guided by the guide surface in a divergent flow,
  a retracted end position in which the widest portion of the needle valve head is upstream of the opening, the flow of air then being laminar and guided by the tip of the needle valve in a convergent flow.

Such a vent makes it possible to target the flow of air onto different parts of the body of the vehicle occupant.

The vent may also have one or more of the following features, taken separately or in combination.

The opening may be circular, and the needle valve head may have a rhombus- or diamond-shaped longitudinal section and be invariant under rotation, an apex of its section forming the tip, and two apices adjacent to the apex forming the tip corresponding to the widest portion and the guide surface and the flared base are frustoconical.

The guide surface may be realized in the form of an annular bulge at one end of an end channel having the opening.

The vent may have an air pipe, which is fixed with respect to the space to be conditioned and through which conditioned air arrives, and in that it has an articulation for inclining the opening and the needle valve with respect to the air pipe.

It may also have:
  an orientation mechanism that controls the articulation between the air pipe and the opening,
  an orientation motor, which is connected to the orientation mechanism and, when actuated, modifies the relative inclination of the opening with respect to the air pipe.

It may also have:
  a mechanism for moving the needle valve in translation, controlling the movement of the needle valve in translation between its end positions,
  a motor for moving the needle valve in translation, which is connected to the mechanism for moving the needle valve in translation and, when actuated, modifies the translational position of the needle valve.

The mechanism for moving the needle valve in translation may have an endless screw, and the motor for moving the needle valve in translation may be a rotary motor.

The vent orientation motor and the motor for moving the needle valve in translation may be electric stepper motors.

The invention also relates to the associated motor vehicle heat control module having:
  an air pipe connected to a heat control system of the vehicle, in which said heat control system outputs a flow of conditioned air,
  a vent as described above.

The motor vehicle heat control module may thus have:

a blower which, when activated, creates a flow of air in an air pipe and has an air inlet from which air forming the flow of air is drawn in, a thermal conditioner disposed in the region of the air pipe for thermally conditioning the flow of air generated by the blower, a vent as described above, which is disposed at the end of the air pipe and through which the flow of conditioned air is output in the direction of an interior of the vehicle.

The thermal conditioner may have Peltier effect thermoelectric cells and/or at least one heating resistor.

The blower may advantageously be configured to generate a flow of air of 0 to 50 kg/h.

The thermal conditioner may advantageously be configured to cool the exiting flow of air to a temperature of between 5 and 15° C.

The heat control device may also have:
a vent orientation mechanism which controls an articulation between the air pipe and the vent,
at least one vent orientation motor, the actuation of which modifies the orientation of the vent with respect to the air pipe,
a mechanism for moving the needle valve in translation, controlling the movement of the needle valve in translation between its end positions,
a motor for moving the needle valve in translation, which is connected to the mechanism for moving the needle valve in translation and, when actuated, modifies the translational position of the needle valve,
a control unit which controls the actuation of the vent orientation motor and the motor for moving the needle valve in translation.

The invention also relates to a motor vehicle heat control system having:
at least one heat control module as described above,
at least one sensor for sensing a variable relating to a thermal state of at least a part of the body of an occupant of the vehicle,
a control unit, which is connected to the at least one sensor and controls:
the blower in order to modify the flow rate of the flow of air,
the thermal conditioner in order to modify the temperature of the flow of air,
the vent orientation motor in order to modify the orientation of the flow of air, and
the motor for moving the needle valve in translation in order to modify the shape of the flow of air output,
in order to generate and direct a flow of air with a flow rate and a shape of flow that are adapted depending on the at least one variable estimated by the sensor.

In said heat management system, the control unit actuates the motor for moving the needle valve in translation in order for it to be possible to pivot the needle valve between different intermediate positions between the end positions, comprising at least one of the following:
a narrow divergent flow position, in which the needle valve is retracted with respect to the end position, in which the widest portion of the needle valve head is downstream of the opening,
a turbulent conical flow position, in which the widest portion of the needle valve head is at the longitudinal level of the opening,
a narrow convergent flow position, in which the needle valve is situated in the direction of the deployed end position with respect to the retracted end position, and in which the widest portion of the needle valve head is upstream of the opening.

The sensor may have at least one infrared camera, the field of view of which is directed toward an expected position of the user.

The control unit may be configured to generate a thermal profile of the occupant and to actuate the blower, the thermal conditioner, the vent orientation motor and/or the motor for moving the needle valve in translation depending on the thermal profile generated, the thermal profile comprising at least one parameter or variable from the following: the presence of at least one occupant, the position of the at least one occupant, the size of the occupant(s), the position of parts of the body of the at least one occupant, the temperature of parts of the body of the at least one occupant, the temperature at different points in the vehicle interior, the presence of incident solar radiation in the vehicle interior or on at least a part of the body of the at least one occupant, the outside temperature, the open or closed state of opening members or windows of the vehicle, the position of the seat of the at least one occupant.

Finally, the invention also relates to a method for controlling the motor vehicle heat control system as described above, having the steps of:
detecting the position of the head of an occupant of the vehicle,
actuating the vent orientation motor in order to oscillate the orientation of the vent between an upper position in which the flow of air is oriented toward the head of the occupant and a lower position in which the flow of air is oriented toward the torso or pelvis of the occupant.

The method may also have the steps of:
capturing images from an infrared camera and/or collecting data from the sensors,
generating a thermal profile of an occupant of the vehicle by means of the images from the thermal camera and the data from the sensors,
detecting hotspots in the thermal profile of the occupant of the vehicle,
actuating the vent orientation motor in order to describe smaller oscillations about the detected hotspots with the needle valve in a retracted position in which the widest portion of the needle valve head is upstream of the opening in order to generate a convergent flow of air.

In said control method, the step of determining the thermal profile of the occupant may have a step of estimating the dimensions and the position of at least a part of the body of the occupant, and in that it has a step of adapting the direction and the position of the needle valve to the estimated dimensions and position of the part(s) of the body of the occupant by actuating the vent orientation motor and the motor for moving the needle valve in translation.

The step of determining the thermal profile of the occupant may have a step of locating and estimating the dimensions of the position of the head and hands of the occupant, and smaller oscillations may be described about the head and hands of the occupant with the needle valve in the retracted position in which the widest portion of the needle valve head is upstream of the opening in order to generate a convergent flow of air.

BRIEF DESCRIPTION OF DRAWINGS

Further features and advantages of the invention will become more clearly apparent from reading the following description, which is given by way of nonlimiting illustrative example, and from the appended drawings, in which.

DETAILED DESCRIPTION

The embodiments described with reference to the figures are examples. Although the description refers to one or more embodiments, this does not necessarily mean that each reference relates to the same embodiment, or that the features apply only to one embodiment. Individual features of different embodiments may also be combined to create other embodiments.

Terms such as "first" and "second" that are used below are given simply by way of reference without indicating any particular preference or order of assembly.

A certain number of prepositions such as "upstream" or "downstream", etc., are also used in connection with the figures. These prepositions are defined, unless specified otherwise, in dependence on the air flow, from an air intake or blower (upstream) in the direction of the vehicle interior in which an occupant is located (downstream).

Figure 1:
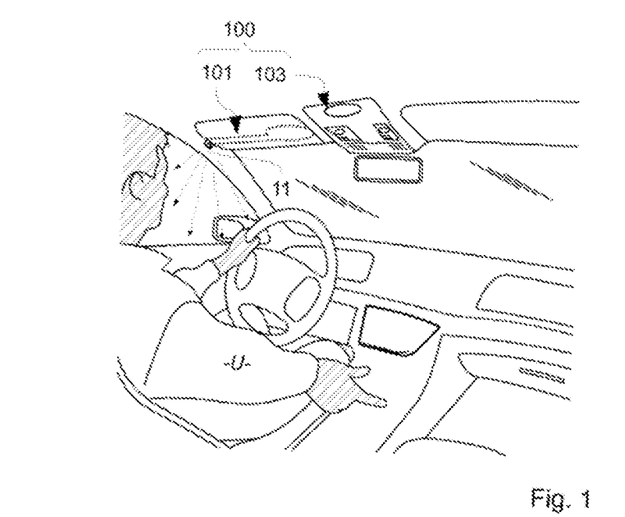
FIG. 1 schematically shows a vehicle interior with a heat control module.

FIG. 1 schematically shows a motor vehicle interior, with an occupant U (in this case in particular the driver) of the vehicle seated in a seat.

A heat control system 100 produces and directs a flow of air (shown in a summary manner by dashed-line arrows) toward specific parts of the body of the occupant U of the vehicle, in this case in particular their head and shoulders. This heat control system 100 is in particular built into a roof of the vehicle interior, at the level of the sun visors.

The heat control system 100 has a heat control module 101 and a detection module 103. These elements are shown outside the roof of the vehicle interior in FIG. 2. In particular, a single heat control module 101 is shown in FIG. 2, but the heat control system 100 may comprise a plurality of modules 101, with in particular at least one heat control module 101 assigned to each occupant U of the vehicle.

Figure 2:
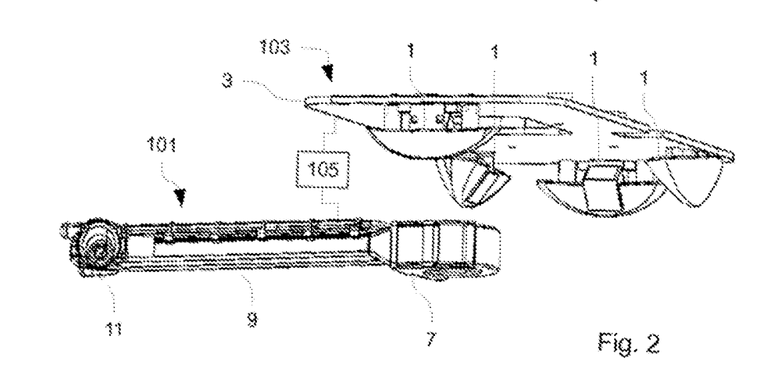
FIG. 2 shows in more detail the heat control system according to a first embodiment of the invention.

The detection module 103, shown outside the vehicle interior in FIG. 2, has a plurality of sensors 1, which are disposed on a holder 3 and directed toward expected positions of the occupants U of the vehicle, in this case for example the driver and/or the passenger of the vehicle.

The sensors 1 may in particular comprise cameras, in particular infrared cameras, and take images in the infrared range. The sensors 1 are directed in particular toward the expected positions of the occupants of the vehicle: the driver's seat, passenger seat, rear bench seat, etc. In particular, one or more very wide-angle cameras (particularly of the "fisheye" type) may cover several positions simultaneously.

A control unit 105 establishes a thermal profile of the occupant(s) U on the basis of the images captured by the camera(s). Said thermal profile includes in particular all the parameters and variables that influence the state and sensation of heat of the occupant(s).

The detection module 103 is in particular positioned at the level of the vehicle roof, and may be hidden from the view of the occupant U by being covered with a cover that is opaque in the visible range of the spectrum but transparent to the radiation used by the sensors 1 (infrared, radio waves, etc.).

The control unit 105 comprises in particular connections to the sensors 1 of the heat control system 100 and to other sensors of the vehicle, such as sensors for the open or closed state of windows or opening members (doors, sunroof etc.) of the vehicle.

In order to establish the thermal profile, the control unit 105 may for example estimate: the presence or absence of the occupant(s) U, their position, their size, the position and the temperature of parts of their body (in particular of their head and of their hands, which are hatched in FIG. 1), the temperature at different points in the vehicle interior, the presence of incident solar radiation in the vehicle interior or on a specific part of the body of the occupants, the outside temperature, and optionally the open or closed state of opening members or windows of the vehicle and the position of the seats in the vehicle interior.

In order to estimate the position in space of different parts of the body of the occupant(s) U, the sensors 1 may in particular comprise cameras that establish a stereoscopic image of the occupant(s) U, emitters of structured light or three-dimensional time-of-flight (3D ToF) cameras, ultrasound emitters/receivers, a lidar or capacitive sensors. Moreover, the sensors may have thermometers positioned at various points in the vehicle interior, pressure sensors built into the seats (used in particular in the context of detecting unrestrained passengers).

At least some of the sensors may be shared with other components of the vehicle, such as an interface for detecting gestures, a unit for detecting tiredness and the level of alertness of the driver etc.

The control unit 105 has in particular a memory unit and calculation means for storing the images and parameters measured or estimated by the sensors and for establishing a thermal profile therefrom. This memory unit and the calculation means may in particular be shared in the context of vehicle on-board electronics controlling other components of the vehicle, or may be situated in a dedicated logic module.

Figure 3:
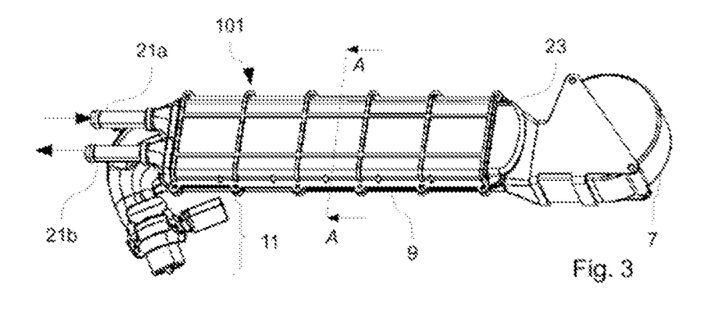
FIG. 3 shows a perspective view of a heat control module of the system in FIGS. 1 and 2.

The heat control module 101 is shown separately in FIG. 3. Said heat control module 101 has in particular a blower 7, a thermal conditioner 9, and a vent 11 through which the flow of air, set in motion by the blower 7 and conditioned by the thermal conditioner 9, is output into the vehicle interior.

The blower 7 may in particular have a bladed fan, which draws in air from an air intake connected either to an exterior air intake or to an air intake situated in the vehicle interior. In particular, the origin of the air entering the blower 7 may be selected by means of flaps and shutters, either automatically by the control unit 105 or by an occupant U of the vehicle on the basis of a "recycled air" button which is generally present in vehicles and makes it possible to select the origin of the air of known heat control devices.

In particular, the blower may generate a flow rate of around 0 to 50 kg/h, which is lower than the flow rate of the known devices and is thus more economical.

The thermal conditioner 9 has in this case a Peltier effect cooling device having a multiplicity of Peltier effect thermoelectric cells which have cold cells in the region of which the air coming from the blower 7 is circulated.

Figure 4:
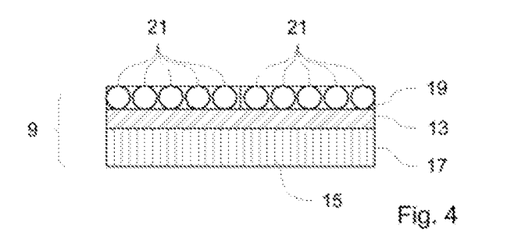
FIG. 4 is a schematic cross-sectional view of the module in FIG. 3, FIGS. 5 and 6 are cross-sectional views of the vent of the module in FIGS. 3 and 4, in partial section.

FIG. 4 is a schematic cross-sectional view of the thermal conditioner 9 on the transverse axis A-A illustrating the operation thereof in a summary manner.

The thermal conditioner 9 has Peltier cells 13, the cold face of which is in thermal contact with fins 15. The fins 15 are disposed longitudinally in an air pipe 17 connecting the outlet of the blower and the vent 11. The fins 15 may in particular be metallic, or made of a highly thermally conductive material.

The hot face of the Peltier cells 13 is in thermal contact with a heat transfer fluid heat exchanger 19, having a plurality of extruded heat transfer fluid pipes 21, an inlet 21a and an outlet 21b of which are visible in FIG. 3. The heat exchanger 19 is in particular connected to a heat control system of the vehicle. An elbow 23, situated at the opposite end from the inlet 21a and the outlet 21b of the circulator 19 ensures return circulation in a part of the pipes 21.

The Peltier cells 13 thus extract heat from the flow of air via their cold faces. This heat, which accumulates at the hot faces of said Peltier cells 13 is collected by the heat transfer fluid of the heat exchanger 19 and then evacuated by the heat control system of the vehicle toward the outside, for example by means of a radiator and associated ventilation.

In the context of the use of the heat control system for heating, the thermal conditioner 9 may in particular have electrical resistors. Alternatively, the Peltier cells 13 may be reversible, the fins then being in contact with their hot face.

The thermal conditioner 9 may also have humidity control devices (humidifiers and/or dehumidifiers, nebulizers), which help to make the conditioned air more pleasant and possibly to enhance the feeling of coolness.

The use of Peltier cells and electrical resistors in a heat control module 101 of small size reduces the thermal inertia of the device for generating the flow of air, which is consequently cool or warm more rapidly.

The thermal conditioner 9, when used for cooling heat control, is in particular designed to supply a flow of air at a temperature of between 5 and 15° C., and more particularly between 7 and 12° C., around 10° C. These temperatures are higher than those of known heat control modules, which cool the flow of air to 4 to 5° C., and this, in combination with the reduced flow rate of the flow of air, helps to make the heat control system more energy efficient.

Figure 5:
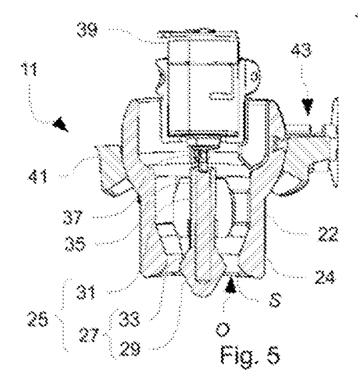
Figure 6:
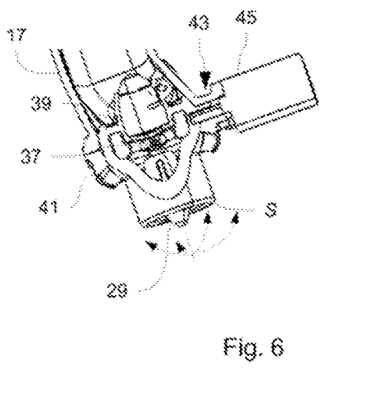

Located at the opposite end of the air pipe 17 from the blower 7 is the vent 11. Said vent 11 is shown in more detail and in section in FIG. 5. FIG. 6 is a partial cross-sectional view of the front portion of the vent 11.

The vent 11 has an opening O, through which the flow of air arriving through the air pipe 17 is output. The opening O situated at the end of an end tube 22 extending the air pipe 17 is in particular circular, and the various components of the vent 11 exhibit relative invariance under rotation, as does the flow of air produced. In order to shape the flow of air, the vent 11 has a needle valve 25, disposed in the opening O. The opening O is disposed more or less at the center of a guide surface S flared in the direction of the flow of air.

The flared guide surface S is in this case obtained by addition of an annular bulge 24 at the free end of the end tube 22. Alternatively, it may be frustoconical.

The needle valve 24 is perpendicular to the opening O and disposed at the center thereof. It has a needle valve head 27, having, at its free end, a conical, in this case rounded, tip 29 and a tubular elongate body 31. The needle valve head 27 has a flared base 33 in the direction of flow of the flow of air, in this case frustoconical, which connects it to the elongate body 31 of the needle valve 25.

The flared base 33 and the tip 29 give the needle valve head 27 a rhombus- or diamond-shaped longitudinal section. The tip 29 is thus formed by an apex of said rhombus- or diamond-shaped section, and two apices adjacent to the apex forming the tip 29 correspond to the widest portion of the needle valve head 27.

The portion of maximum width (in this case the transition between the flared base 33 and the tip 29) has a shape corresponding to the opening O, with dimensions of between 80% and 100% of those of the opening O, in particular between 90 and 95% of these dimensions.

The body of the needle valve 31 is rotationally fixed and free to move in axial translation with respect to the end tube 22.

The end of the tubular screw 25 is connected by a universal joint 37 to a motor 39 for moving the needle valve in translation, the actuation of which, by causing the tubular screw to turn, moves the needle valve 25 between two end positions, namely:
- a deployed end position (see FIG. 7), in which the widest portion of the needle valve head 27 is downstream of the opening O in the direction of the vehicle interior,
- a retracted end position (FIG. 12), in which the widest portion of the needle valve head 27 is upstream of the opening O.

The needle valve body 31 is hollow, and has at its center a tubular hole parallel to its longitudinal axis, which is bored or covered with a screw pitch. A tubular screw 35 is inserted into said tubular hole, with a corresponding screw pitch or bore engaged with that of the tubular hole. The central hole and the cylindrical screw 35 thus form an endless screw and tapped hole.

An alternative embodiment, which is not shown, provides a connecting rod, one end of which is connected to the base of the needle valve body 31, and the rotation of which modifies the axial position of the needle valve 25.

The end tube 22 having the opening O has a base forming a ball-joint connection forming an articulation of the opening with respect to a fixed holder 41. An orientation mechanism 43, for example in the form of controlled-inclination suspended universal joints, makes it possible to change its orientation in order to direct the flow of air to different points of the vehicle interior, while the air pipe 17 and therefore the heat control module 101 remain fixed.

At least one orientation motor 45 (FIG. 6) is connected to the orientation mechanism 43 and, when actuated, modifies the relative inclination of the end tube 22 and of the opening O with respect to the air inlet 17 and to the fixed support 41.

In particular, two orientation motors 45 (only one is visible in FIG. 6) having an associated orientation mechanism 43 can serve to incline the vent 11 in orthogonal directions (dashed-line arrows in FIG. 6) such that it is possible to direct the flow of air in a cone covering a part of the vehicle interior.

The vent 11 advantageously has a vertical travel of 30 to 40°, so as to be able to direct the flow of air from the top of the head to the pelvis of the occupant U of the vehicle. In the context of a heat control system 100 having a plurality of modules 101, a horizontal travel of 10 to 20° is sufficient to sweep the width of the body of the occupant U of the vehicle.

The motor 39 for moving the needle valve in translation and the vent orientation motor 45 are in particular rotary electric stepper motors (or steppers) which are actuated by the control unit 105 by controlled current injection, for example in the form of pulses of variable frequency and duration.

FIGS. 7 to 12 illustrate different notable relative positions of the needle valve 25 with respect to the opening O. FIGS. 7 to 12 are views in longitudinal section of the front part (toward the opening) of the vent 11.

Figure 7:
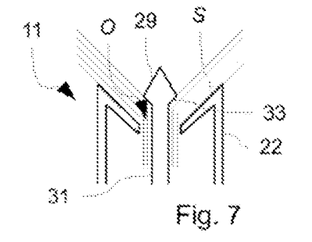
FIGS. 7 to 11 are schematic cross-sectional views of the vent with a needle valve in different positions for generating different shapes of the flow of air.

In FIG. 7, the needle valve 25 is in the deployed end position, as described above. The flow of air (indicated by thin parallel lines) exits through the opening O between the guide surface S and the flared base 33, in the form of a conical flow. The laminar flow is guided by the guide surface S and the flared base 33, and forms a wide laminar cone with a reduced average speed.

This position of the needle valve produces a wide flow, of average intensity and with a range of around a few tens of centimeters. This flow is for example indicated for the arms or the torso of an occupant of the vehicle.

Figure 8:
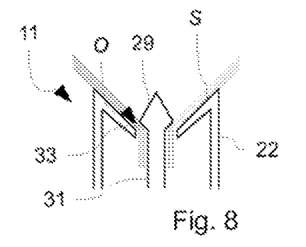

In FIG. 8, the needle valve 25 has been returned toward the inside compared with FIG. 7. The widest portion of the needle valve 25 is still downstream of the opening O but is closer to said opening O.

The flow is still laminar and guided by the guide surface S and the flared base 33, but output over a smaller section (closer together thin lines), and the average speed of the air in the flow is consequently higher at a constant flow rate.

This narrow divergent flow position produces a flow indicated for the torso or the pelvis of a user, and has a larger range than the wide flow produced by the deployed end position.

Figure 9:
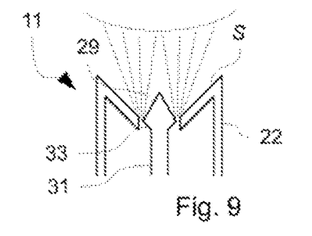

In FIG. 9, the needle valve 25 has been returned further toward the inside, and the widest portion is situated at the axial level of the opening O. The section of opening O through which the flow of air passes is then smaller and in particular creates a higher Reynolds number. The flow of air is annular and divergent (bundled lines) but, after a few centimeters to a few tens of centimeters, becomes turbulent in a bubble (downstream of the circle portion depicted).

This turbulent conical flow position produces a flow of relatively short range indicated for the face of the occupant on account of the lack of lines of high speed laminar flow, which may be unpleasant or even blinding when they are directed at the eyes.

Figure 10:
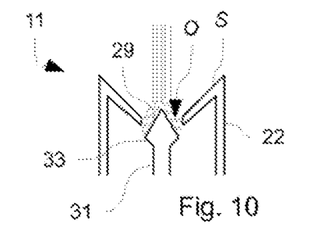
Figure 11:
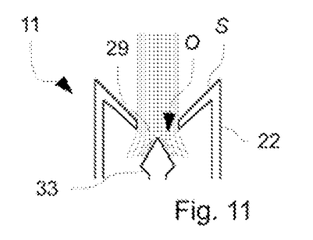

In FIG. 10, the widest portion of the needle valve head 27 is situated just upstream of the opening O, in particular closer to said opening O than in the retracted end position (FIG. 11). The flow of air is then laminar and narrow, with a high average speed for a given flow rate.

The laminar flow of air is in particular guided by the tip 29 of the needle valve 25 and is convergent, or at least slightly divergent, this being represented by the parallel flow lines downstream of the tip 29, which are parallel to the edge of the tip 29 at the level thereof.

The flow of air generated by this narrow convergent flow position has a high speed and a long range, and remains in particular concentrated and intense over the typical lengths in the vehicle interior. It is particularly indicated for cooling the parts of the body that are particularly hot and far away, for example an unclothed hand.

The control unit 105 controls in particular the motor 39 for moving the needle valve in translation so as to pivot the needle valve 25 between the above-described positions, and optionally intermediate positions (more or less narrow flows of air).

An example of a control method 200 of relatively low complexity for a heat control system 100 as described above is schematically shown in FIG. 12, in the form of a linear flow diagram.

Figure 12:
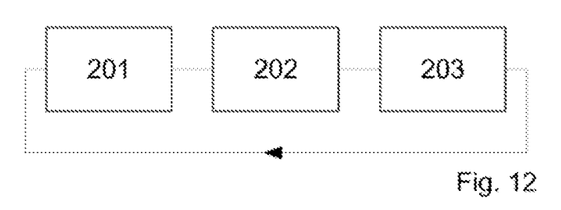
FIG. 12 is a flow diagram illustrating a method for controlling the heat control system.

The first step 201 is a step of detecting the position of the head of an occupant of the vehicle, in particular using the sensors 1 (face recognition in the images for example).

The second step 202 is a step of estimating the position of the different parts of the body of the occupant U on the basis of the position of the head, and on the basis of tables of human body proportions, and the calculation of a ventilation cycle covering the entire upper part (head, torso, abdomen) of the body of the occupant U with an adapted shape of flow for each part of the body.

The third step 203 is the step of actuating the vent orientation motor 45 and the motor 39 for moving the needle valve in translation. The vent orientation motor 45 is actuated so as to oscillate the orientation of the vent 11 between an upper position in which the flow of air is oriented toward the head of the occupant U and a lower position in which the flow of air is oriented toward the torso or pelvis of the occupant U.

During a cycle of oscillating the vent 11, the motor 39 for moving the needle valve in translation is actuated in order to adapt the shape of the flow of air to the part of the body at which the vent is pointed.

The approximate positions and dimensions of the parts of the body of the occupant U can in particular be estimated or calculated by the control unit 105 from images of the vehicle interior taken by cameras incorporated in the detection module 103 for better adaptation of the shape of the flow of air to the parts of the body. The method 200 thus has a step of adapting the power and/or the shape of the flow of air to the portion of the body toward which the flow is oriented.

The needle valve 25 is for example in a turbulent conical flow position (FIG. 9) on the face and the head, then in narrow convergent flow (FIG. 10) or in the retracted end position (FIG. 11) on the neck and the shoulders, and in narrow divergent flow (FIG. 8) or in the deployed end position (FIG. 7) on the torso and the abdomen.

The flow rate and the narrowness of the flow can in particular be adapted to a setpoint selected by the occupant (interface having a power selector) and adapted by the control unit 105 to a detected interior temperature, or to the temperature of exposed parts of the body of the occupant U measured by means of the sensors 1.

The method 200 may in particular be repeated cyclically in order to follow the movements of the occupant U in the vehicle interior.

For customization and more precise adaptation of the control method 200 and of the sensation of coolness (or warmth) provided, the sensors may in particular capture one or more variables relating to the thermal state of the occupant in order to establish a thermal profile of the user, comprising for example the position, the size and the temperature of one or more parts of the body of the occupant U that are in the form of hotspots, such as the hands and the face of the occupant U, the size and position of which are thus estimated.

In a large vertical or diagonal oscillation from the head to the abdomen or the legs of the occupant U, which generally covers an angle of around 20 to 40° (generally around) 30°, the control unit 105 thus provides a predetermined number of smaller-angle oscillations at the hotspots detected.

For example, three to five oscillations are effected at an angle of 5° at the level of the face, with the needle valve 25 in a turbulent conical flow position, then further down in the large up/down oscillation, at the angular position in which the flow of air is directed toward the hands (generally in the region of the steering wheel), new smaller oscillations of 3 to 5° are effected with the needle valve 25 in the narrow convergent flow position or in the retracted end position.

Between the hotspots, the needle valve 25 is in particular in the narrow divergent flow position or in the deployed end position. Between the hotspots, more complex paths such as "zigzags" or wavelets or larger circles can be described.

Figure 13:
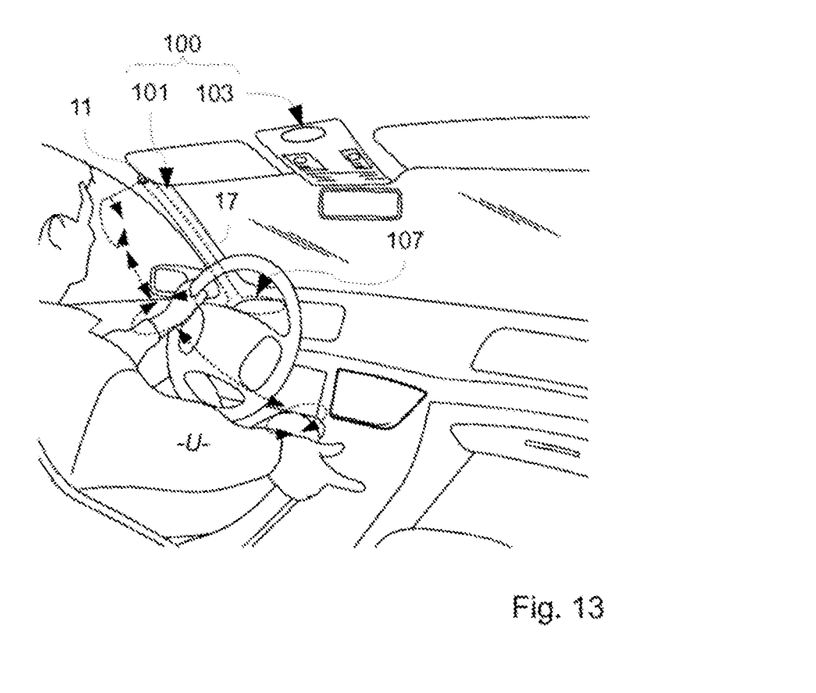
FIG. 13 illustrates an embodiment of an alternative system and control method for a heat control system according to the invention.

FIG. 13 is a view of a motor vehicle interior similar to the one in FIG. 1. In the embodiment shown, the heat control module 101 has a vent 11 and an air pipe 17 connecting the vent 11 to the heat control system 107 of the vehicle. The flow of cooled or heated air is thus initially produced by a compressor and a fan as are usually implemented in vehicles, and a simple system of deflectors and flaps can distribute the flow of air between the vent 11 and the usual air outlets that are distributed through the vehicle interior and are realized in the form of gratings.

The main direction of the flow of air and its path through the vehicle interior are indicated by dashed-line arrows. In particular, the flow of air is in this case oriented in two orthogonal directions (up/down and left/right).

Starting from the top, the flow of air is initially directed toward the head and the face of the user, in a top and central position in which a first circular oscillation is realized, for example with a turbulent conical flow of air, the face being fairly close to the vent for the thermal effect to be felt.

After a predetermined number of circular oscillations, the flow of air is directed progressively downward, in the direction of the neck with a narrow or wide convergent flow, and the torso with a narrow or wide divergent flow, and is then pointed toward the left hand of the occupant U, where a second cycle of smaller circular oscillations is effected, with a wide convergent flow of air (retracted end position of the needle valve 25, FIG. 11).

The flow of air is then directed toward the right hand, which is in this case currently interacting with an interface at the central console of the vehicle and is consequently further away. A third cycle of smaller circular oscillations is then effected, with a narrow convergent flow of air (position in FIG. 10).

The heat control system 100 according to the invention thus makes it possible to generate a "bubble" of coolness or warmth felt around the body of the occupants U, and in particular to rapidly provide a feeling of coolness or warmth by targeting the parts of the body such as the hands and the head, which are generally exposed and have a high degree of vascularization.

By using a dedicated heat control module 103, with lower thermal inertia, the speed of generation of a flow of air is reduced further, while allowing an energy saving.

The vent 11 and the possible associated heat control module 103 may be replaced or associated with heat control devices of the vehicle. Said heat control devices can then function in parallel with the heat control modules 103 according to the invention, and/or take over progressively when they achieve a sufficiently low or high temperature of the flow of air.

The control method 200 and the more complex derivatives thereof using an individual thermal profile for each of the occupants U makes it possible to adapt the bubble of coolness or warmth to the build and the position of each one, and targeted cooling or heating is effected on the parts of the body that are exposed and have a high degree of vascularization (hand and head), while following the movements thereof.

The invention claimed is:

1. A motor vehicle interior vent configured to deliver a flow of air in a direction of a space to be conditioned, the vent comprising:
   an opening, through which the flow of air can flow during operation;
   a flared guide surface, extending from the opening, and flared in the direction of flow of the flow of air; and
   a needle valve having a needle valve head including:
      a tip situated at the end of the needle valve,
      a portion of maximum width with a shape corresponding to the opening, with dimensions of between 80% and 100% of those of the opening,
      a flared base in the direction of flow connecting the head to an elongate body,
      the needle valve being movable in translation between two end positions, namely:
         a deployed end position in which the widest portion of the needle valve head is downstream of the opening in the direction of the space to be conditioned, the flow of air then being laminar and guided by the guide surface in a divergent flow, and
         a retracted end position in which the widest portion of the needle valve head is upstream of the opening, the flow of air then being laminar and guided by the tip of the needle valve in a convergent flow.

2. The vent as claimed in claim 1, further comprising:
   an air pipe, which is fixed with respect to the space to be conditioned and through which conditioned air arrives, and
   an articulation for inclining the opening and the needle valve with respect to the air pipe.

3. The vent as claimed in claim 2, further comprising:
   an orientation mechanism that controls the articulation between the air pipe and the opening; and
   an orientation motor, which is connected to the orientation mechanism and, when actuated, modifies the relative inclination of the opening with respect to the air pipe.

4. The vent as claimed in claim 1, further comprising:
   a mechanism for moving the needle valve in translation, controlling the movement of the needle valve in translation between its end positions,
   a motor for moving the needle valve in translation, which is connected to the mechanism for moving the needle valve in translation and, when actuated, modifies the translational position of the needle valve.

5. A motor vehicle heat control module having:
   an air pipe connected to a heat control system of the vehicle, in which said heat control system outputs a flow of conditioned air,
   a vent as claimed in claim 1, which is disposed at the end of the air pipe and through which the flow of conditioned air is output in the direction of an interior of the vehicle.

6. A motor vehicle heat control module having:
   a blower which, when activated, creates a flow of air in an air pipe and has an air inlet from which air forming the flow of air is drawn in;
   a thermal conditioner disposed in the region of the air pipe for thermally conditioning the flow of air generated by the blower; and a vent as claimed in claim 1, which is disposed at the end of the air pipe and through which the flow of conditioned air is output in the direction of an interior of the vehicle.

7. The heat control module as claimed in claim 6, further comprising:
- a vent orientation mechanism which controls an articulation between the air pipe and the vent;
- at least one vent orientation motor, the actuation of which modifies the orientation of the vent with respect to the air pipe;
- a mechanism for moving the needle valve in translation, controlling the movement of the needle valve in translation between its end positions;
- a motor for moving the needle valve in translation, which is connected to the mechanism for moving the needle valve in translation and, when actuated, modifies the translational position of the needle valve; and
- a control unit which controls the actuation of the vent orientation motor and the motor for moving the needle valve in translation.

8. A motor vehicle heat control system having:
- at least one heat control module as claimed in claim 7,
- at least one sensor for sensing a variable relating to a thermal state of at least a part of the body of an occupant of the vehicle,
- a control unit, which is connected to the at least one sensor and controls:
- the blower to modify the flow rate of the flow of air,
- the thermal conditioner to modify the temperature of the flow of air,
- the vent orientation motor to modify the orientation of the flow of air, and
- the motor for moving the needle valve in translation in order to modify the shape of the flow of air output,
- in order to generate and direct a flow of air with a flow rate and a shape of flow that are adapted depending on the at least one variable estimated by the sensor.

9. The heat control system as claimed in claim 8, wherein the control unit actuates the motor for moving the needle valve in translation to pivot the needle valve between different intermediate positions between the end positions, comprising at least one of the following:
- a narrow divergent flow position, in which the needle valve is retracted with respect to the end position, in which the widest portion of the needle valve head is downstream of the opening,
- a turbulent conical flow position, in which the widest portion of the needle valve head is at the longitudinal level of the opening,
- a narrow convergent flow position, in which the needle valve is situated in the direction of the deployed end position with respect to the retracted end position, and in which the widest portion of the needle valve head is upstream of the opening.

10. The heat control system as claimed in claim 8, the control unit is configured to generate a thermal profile of the occupant and to actuate the blower, the thermal conditioner, the vent orientation motor and/or the motor for moving the needle valve in translation depending on the thermal profile generated, the thermal profile comprising at least one parameter or variable from the following: the presence of at least one occupant, the position of the at least one occupant, the size of the occupant(s), the position of parts of the body of the at least one occupant, the temperature of parts of the body of the at least one occupant, the temperature at different points in the vehicle interior, the presence of incident solar radiation in the vehicle interior or on at least a part of the body of the at least one occupant, the outside temperature, the open or closed state of opening members or windows of the vehicle, the position of the seat of the at least one occupant.

11. A method for controlling a motor vehicle heat control system, the method comprising:
- detecting a position of a head of an occupant of a vehicle,
- actuating a vent orientation motor to oscillate an orientation of a motor vehicle interior vent between an upper position in which a flow of air is oriented toward the head of the occupant and a lower position in which the flow of air is oriented toward a torso or pelvis of the occupant,
- wherein the vent comprises:
  - an opening, through which the flow of air can flow during operation;
  - a flared guide surface, extending from the opening, and flared in the direction of flow of the flow of air; and
  - a needle valve having a needle valve head including:
    - a tip situated at the end of the needle valve,
    - a portion of maximum width with a shape corresponding to the opening, with dimensions of between 80% and 100% of those of the opening,
    - a flared base in the direction of flow connecting the head to an elongate body,
    - the needle valve being movable in translation between two end positions, namely:
      - a deployed end position in which the widest portion of the needle valve head is downstream of the opening in the direction of the space to be conditioned, the flow of air then being laminar and guided by the guide surface in a divergent flow, and
      - a retracted end position in which the widest portion of the needle valve head is upstream of the opening, the flow of air then being laminar and guided by the tip of the needle valve in a convergent flow.

12. The method for controlling the motor vehicle heat control system as claimed in claim 11, further comprising:
- capturing images from an infrared camera and/or collecting data from one or more sensors,
- generating a thermal profile of the occupant of the vehicle by the images from the infrared camera and the data from the one or more sensors,
- detecting hotspots in the thermal profile of the occupant of the vehicle,
- actuating the vent orientation motor in order to describe smaller oscillations about the detected hotspots with the needle valve in the retracted position.

* * * * *